N. D. CHARD.
LATHE.
APPLICATION FILED MAR. 14, 1910.
982,034.
Patented Jan. 17, 1911.
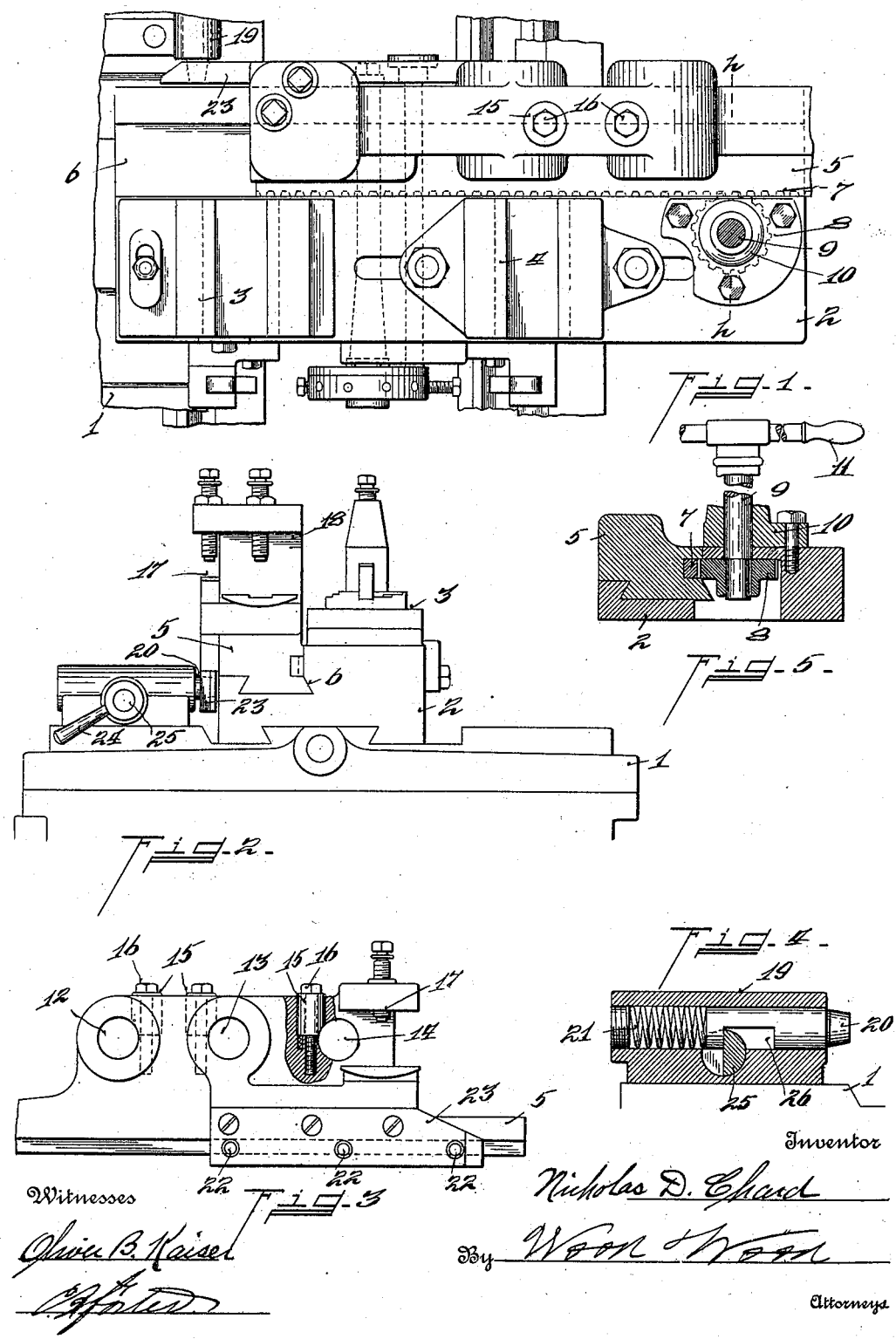

UNITED STATES PATENT OFFICE.

NICHOLAS D. CHARD, OF CINCINNATI, OHIO, ASSIGNOR TO THE LODGE & SHIPLEY MACHINE TOOL COMPANY, OF CINCINNATI, OHIO, A CORPORATION OF OHIO.

LATHE.

982,034. Specification of Letters Patent. Patented Jan. 17, 1911.

Original application filed September 22, 1909, Serial No. 519,025. Divided and this application filed March 14, 1910. Serial No. 549,262.

*To all whom it may concern:*

Be it known that I, NICHOLAS D. CHARD, a citizen of the United States, residing at Cincinnati, in the county of Hamilton and State of Ohio, have invented certain new and useful Improvements in Lathes, of which the following is a specification.

My invention relates to an improvement in lathes.

The object of my invention is to provide a lathe carriage and tool-slide, with an auxiliary tool-slide provided with a multiple of tool-holders, with means for automatically setting the same in alinement with the lathe centers, whereby any one of the series of tools upon the auxiliary slide can be quickly brought to its position irrespective of the position of the primary tool-slide.

The features of my invention are more fully set forth in the description of the accompanying drawings, forming a part of this specification, in which:—

Figure 1 is a top plan view of the lathe carriage with my improvement applied. Fig. 2 is a front elevation of the same. Fig. 3 is a side elevation of the supplemental tool holding slide. Fig. 4 is a central vertical section through the stop fixed to the carriage for locking the supplemental tool holding slide. Fig. 5 is a section on line *h, h*, Fig. 1.

This application is divisional of an application filed by me, September 22, 1909, Serial No. 519,025, for improvement in lathes, in which the general organization of the lathe is such as to render it possible to turn duplicate pieces of work to accurate precision without gaging, providing an automatic stop for carriage feed and tool cross feed upon the carriage, whereby various predetermined widths and diameters of finished work can be produced without stopping the carriage feed for calipering or measuring. In the use of such tool, the work in many instances is required to be bored and tapped and which it is desired to accomplish without removing the work from the head-stock or unchucking it. I therefore provide the primary tool slide with a supplemental tool holding slide.

1 represents the carriage of commercial form provided with the usual transmission mechanism, not shown, for feeding the same horizontally over the bed of the lathe. Likewise, the primary tool slide 2 is provided with the usual cross feed mechanism, not shown.

As illustrated, the primary slide 2 is provided with two tool-holders 3, 4, for supporting the tool post and cutting tools.

5 represents a supplemental tool holding slide, slidably mounted in the slide-way 6, formed in the main or primary slide 2, and adjusted thereon by means of a rack 7, carried by the supplemental slide, engaging a rack-pinion 8, fixed to the shaft 9, journaled and supported within the bearing 10, said bearing being fixed to the primary slide 2.

11 represents a hand-wheel fixed to the shaft 9, the rotation of which will cause the supplemental slide to travel in the direction desired.

It is desirable to provide the supplemental slide 5, with a series of tool-holders for supporting the drill or like cutting tools, or facing tools to finish the ends of the work. These consist of the orifices 12, 13, and 14, each having a clamping sleeve 15 and clamp bolt 16, for clamping the tool within the orifice.

17 and 18 represent tool holders at the forward end of the supplemental slide 5, preferably disposed at right-angles to each other.

To bring any one of the tool-holders of the supplemental slide in alinement with the lathe centers, and lock the same in such position, I provide the following means:—19 represents a bearing plate fixed to the carriage, provided with a lock pin 20, slidably mounted within a bore of the plate 19 and under outward tension through spring 21 bearing against the same. This lock pin 20 is adapted to be engaged into any one of the series of notches 22, formed in the plate 23, depending from one side of the supplemental slide 5, in the path of lock pin 20. The number of notches required, are according to the number of tool-holders with which the slide is provided. The release of the lock-pin 20, is accomplished by a lever 24, fixed to a notched pin 25, having coincident engagement with a notch 26, see Fig. 4, formed in the lock-pin 20. Moving the releasing lever 24 in one direction will cause engagement between the pins 20, 25, moving the pin 20 against the tension of the spring 21, and maintaining it in such position until manually released by a further or reverse movement of the hand lever 24.

Having described my invention, I claim:—

In a machine tool of the class described, a carriage, a main tool-holding slide thereon, in combination with a supplemental tool-holding slide movably mounted upon said first named slide, a series of tool-holders carried by said supplemental slide for supporting the cutting tool in axial line with the machine centers, means for actuating said supplemental slide, and means for locking the same in various positions upon the main slide.

In testimony whereof, I have hereunto set my hand.

NICHOLAS D. CHARD.

Witnesses:
 OLIVER B. KAISER,
 LUISE BECK.